Patented Jan. 16, 1934

1,943,821

UNITED STATES PATENT OFFICE 1,943,821

PREROASTING OF HYDROGEN PRODUCTION CATALYSTS

William V. Hanks, Baton Rouge, La., and George H. Freyermuth, Elizabeth, N. J., assignors to Standard Oil Development Company, a corporation of Delaware No Drawing. Application May 5, 1931
Serial No. 535,306

10 Claims. (Cl. 23—233)

This invention relates to the production of hydrogen from hydrocarbons, and more specifically to an improved method of preparation of catalysts for use in the conversion of hydrocarbons with steam to produce hydrogen and oxides of carbon.

It is known that hydrogen may be produced by the reaction of normally gaseous or liquid hydrocarbon vapors and steam over suitable catalysts, at materially elevated temperatures. Catalysts for this reaction have been described, and may consist of nickel, cobalt, or iron (which metals may be referred to as "metals of the iron group") activated by addition of other metals or metallic compounds for which purpose metals having difficultly reducible oxides or compounds of such metals are especially suitable. For example, chromium, vanadium or compounds of each and of the alkali, alkaline earth, or earthy metals such as potassium, magnesium or aluminum, or other metals may be employed as activators. Compounds of nickel, cobalt, or iron may also be used.

Especially desirable catalysts for hydrogen production have been described as consisting of nickel or cobalt activated with aluminum, magnesium, chromium, and other activating metals. It is understood that any number of the metallic elements of the catalyst may be present either as metals, or as oxides or other suitable compounds. Various methods for the preparation of such catalysts have been described which consist in the preparation of a "raw" or "green" mixture containing the catalytic materials (which, when dried at temperatures below about 400° F., will hereafter be called the "green" catalyst) and the final reduction or calcining of this mixture at approximately the operating temperatures to be used in the subsequent production of hydrogen.

The first steps in one customary method of preparing these catalysts consists in forming mixed precipitates, such as carbonates, hydroxides, and the like, from solutions of salts of the metals. Soluble substances remaining in such mixtures in undesirably large concentration, such as sodium salts, may be removed by washing the precipitates. Another method consists in saturating oxides or dried precipitates of part of the catalytic materials with a solution of salts of the remaining metals desired in the catalyst. Other combinations of these methods may be used. A general characteristic of all such methods of catalyst preparation is that the "green" catalyst contains only such materials as are desired in the final catalyst, or are decomposable by heat, with vaporization of the materials not desired, at temperatures insufficient to seriously impair the activity of the catalyst for subsequent hydrogen production from hydrocarbons. The "green" catalyst may consist, for example, of mixtures of oxides, hydroxides, carbonates, nitrates, and similar compounds. It is usually customary to form the "green" catalyst paste into suitable shapes such as briquettes, cubes, rods, and the like, which are then dried.

The final reduction or calcining of the "green" catalyst has been described as conducted at temperatures only sufficient to decompose the nitrates, and generally at temperatures not exceeding about 750° F. These catalysts so prepared have been described as especially suitable for the conversion of hydrocarbons with steam to produce hydrogen and oxides of carbon at temperatures below about 1300° F., although it has been stated that higher temperatures may be used, and that temperatures of about 1800° F., are necessary when the hydrocarbons contain organic sulfur compounds. We have found that the use of such high temperatures also materially increases the rate of conversion of the hydrocarbons and that such high temperature operation is especially desirable when the gas contains hydrocarbons heavier than ethane or propane, or unsaturated hydrocarbons, such as ethylene and its homologs.

We have now found that catalysts prepared by the above methods are extremely soft. They undergo considerable losses due to dusting and the formation of fines on handling or shipping, and they cannot be used at high gas velocities. These catalysts, on heating to temperatures above about 1400° F., also undergo an appreciable shrinkage in volume, which becomes more marked at higher temperatures. We have observed shrinkages of 30 to 50% or higher occurring in a short time on heating the "green" catalyst to temperatures of about 1600 to 1800° F. This shrinkage is a serious disadvantage in hydrogen production, for it reduces the effective volume of the catalyst zone and leaves the upper portion of the catalytic equipment empty, thereby reducing the hydrogen production capacity of the equipment. It may even render the catalyst entirely unsuited for use in certain types of hydrogen production equipment in which catalyst shrinkage permits the formation of gas channels; for example, equipment having the catalytic reaction chambers placed substantially horizontally.

It is the object of our invention to prepare these very active hydrogen production catalysts in a form having much greater physical strength and showing a greatly decreased tendency towards dusting or shrinkage in subsequent handling or use.

In our method of preparation we subject the "green" catalyst, prepared by any of the methods already described, to a roasting process in which we heat the "green" catalyst slowly to a temperature of about 1600 to 1800° F. while passing over it a continuous current of steam or other flushing gases.

The volume of flushing gases used may be suitably about 30 volumes per volume of catalyst per hour, but much greater or less amounts may be used, as from about 10 volumes to 300 volumes. The amount will be sufficient if condensation of corrosive liquids in the roasting tubes or vapor release pipes is prevented, as will be obvious to one skilled in the art. Other suitable gases which may be used are air, inert gas, sulfur-free flue gases, nitrogen, hydrogen, and the like, or mixtures of such gases. When steam is to be used as the flushing gas we have found it desirable to pass some other non-condensing gas through the catalyst until its temperature is raised above about 220° F. when steam may safely be admitted. In general it is desirable to avoid condensation of the flushing gases or the vaporized products of decomposition in any part of the catalyst.

If the roasted catalyst is to be used at temperatures above about 1600° F. for the conversion of hydrocarbons with steam, we have found steam a very cheap and convenient gas for the flushing operation. But if the catalyst is to be used at temperatures below 1600° F., such as 1300° F. or at even lower temperatures, as 700° F. it is preferable to conduct at least the final part of the roasting period in the presence of a reducing gas.

The reduction may be conducted either at the same temperature as the roast, or at lower temperatures, but the reduction temperature is preferably not less than the subsequent operating temperature at which the catalyst is to be used for hydrogen production.

The flushing gas should be substantially free from substances which are poisons for the hydrogen production catalyst, such as sulfur compounds, halides and the like. Great care should be used not to raise the catalyst to a temperature above about 1900° F. The catalyst is maintained at the final temperature of the roast for an extended period of 12 hours to 2 or 3 days or longer. It may then be used in the catalytic reformation of hydrocarbons with steam in the same equipment at the same or lower temperatures. However, we prefer to cool the catalyst following this roasting treatment and to screen it to remove dust and fine particles, for we have observed that there is some dust formation always attendant on the first heating of dried catalyst of the type herein described, and that when the catalyst is heated directly to reaction temperatures in the same equipment in which it is to be used for the production of hydrogen this dust tends to clog the open space between the catalyst lumps.

We have found that catalysts prepared in this manner show much greater physical strength and rigidity than the same catalysts which are only dried, or which are heated at temperatures lower than about 1600° F. We have also observed that all corrosive products of heat decomposition are removed from the catalyst and that the danger of subsequent corrosion of hydrogen production equipment from such constituents originally in the catalyst is thereby avoided. Catalysts prepared from the raw catalytic material undergo a marked decrease in volume during the first few hours of heating to reaction temperatures above about 1400° F., which may be as high as 30 to 50% or even more. In the present case the roasted catalysts show only a very small subsequent shrinkage.

We have found that our specially roasted catalysts are particularly suitable for use in hydrogen production from refinery gases, in processes such as that described in the co-pending application, Ser. No. 434,036 of Messrs. Hanks, Freyermuth and Small. Our improved catalyst has a greater resistance to any tendency towards dusting caused by the alternate reformation of hydrocarbons with steam with accompanying deposition of carbon on the catalyst and the removal of this carbon by oxidation with steam and/or air.

Our invention is not to be limited by any theory of the mechanism of the process nor to any specific example which may have been given for purpose of illustration, but only by the following claims in which it is wished to claim all novelty inherent in this invention.

We claim:

1. An improved method for preparing catalyst for the production of hydrogen from hydrocarbon vapor and steam at elevated temperatures comprising the steps of first preparing a paste containing heat decomposable compounds of a metal or metals of the iron group, admixed with activators; second, heating this paste to remove uncombined water; third, bringing the dried paste to a temperature of 1,600° to 1,900° F. while continuously passing over it a flushing gas free from catalyst poisons and maintaining the catalytic material at this temperature for an extended period of time.

2. Method according to claim 1 in which the dried paste is saturated with a solution of heat decomposable compounds of suitable catalytic activators prior to the roasting process.

3. An improved method for preparing catalysts for the production of hydrogen from hydrocarbon vapors and steam at elevated temperatures comprising preparing a dried paste containing heat decomposable compounds of nickel and of suitable activators, heating this paste to a temperature of 1,600° F. to 1,900° F. while continuously passing over it a flushing gas free from catalyst poisons and maintaining it at this temperature for about 12 to 72 hours.

4. Method according to claim 1 in which the said heat decomposable compound of a metal of the iron group comprises a compound of cobalt.

5. Method according to claim 3 in which the flushing gas is steam.

6. Method according to claim 3 in which a reducing gas free of catalyst poisons is passed over the roasted catalytic material at a temperature not greater than that of the roast, and sufficient to cause a reduction of the oxides of nickel.

7. Method according to claim 3 in which the paste contains nickel nitrate.

8. Method according to claim 3 in which the paste contains nickel carbonate.

9. Method according to claim 3 in which the paste contains hydrates of aluminum.

10. Method for preparing improved catalysts in lump form suitable for the production of hydrogen from hydrocarbon vapor and steam at elevated temperatures, comprising the steps of preparing a paste containing a heat decomposable composition of nickel admixed with an activator, forming said paste into suitable lumps, heating said lumps to remove uncombined water, bringing the dried lumps to a temperature of 1,600 to 1,900° F. while continuously passing in direct contact with said lumps a flushing gas free of catalyst poisons and maintaining the lumps at this temperature for an extended period of time.

WILLIAM V. HANKS.
GEORGE H. FREYERMUTH.